US005999284A

United States Patent [19]
Roberts

[11] Patent Number: 5,999,284
[45] Date of Patent: Dec. 7, 1999

[54] OPTICAL DETECTION AND LOGIC DEVICES WITH LATCHING FUNCTION

[75] Inventor: Kim Byron Roberts, Welwyn Garden, United Kingdom

[73] Assignee: Northern Telecom Limited, Montreal, Canada

[21] Appl. No.: 08/869,901

[22] Filed: Jun. 5, 1997

[51] Int. Cl.$^6$ ............................................. G02F 3/00
[52] U.S. Cl. ................... 359/108; 359/900; 250/227.27; 356/345
[58] Field of Search ................................ 359/107, 108, 359/900; 385/14; 356/345; 250/227.19, 227.21, 227.27

[56] References Cited

U.S. PATENT DOCUMENTS

| | | | |
|---|---|---|---|
| 4,128,300 | 12/1978 | Stotts et al. ............................... | 385/15 |
| 4,262,992 | 4/1981 | Berthold, III ............................ | 385/115 |
| 4,573,767 | 3/1986 | Jewell ....................................... | 359/243 |
| 4,764,889 | 8/1988 | Hinton et al. ............................ | 364/807 |
| 4,823,360 | 4/1989 | Tremblay et al. ........................ | 375/214 |
| 4,928,007 | 5/1990 | Fürstenua et al. ................... | 250/227.27 |
| 4,930,873 | 6/1990 | Hunter ..................................... | 359/108 |
| 4,932,739 | 6/1990 | Islam ........................................ | 359/108 |
| 5,315,422 | 5/1994 | Utaka et al. ............................. | 359/107 |
| 5,353,114 | 10/1994 | Hansen ..................................... | 385/14 |
| 5,537,243 | 7/1996 | Fatehi et al. ............................. | 359/108 |
| 5,617,232 | 4/1997 | Takemori ................................. | 359/108 |
| 5,739,933 | 4/1998 | Dembeck et al. ....................... | 359/117 |

FOREIGN PATENT DOCUMENTS

| | | | |
|---|---|---|---|
| 0632313A1 | 1/1995 | European Pat. Off. .......... | G02F 1/35 |
| 59-164533 | 9/1984 | Japan ....................................... | 385/14 |
| 59-223015 | 12/1984 | Japan ....................................... | 359/107 |
| 60-68330 | 4/1985 | Japan ....................................... | 385/14 |
| 60-202430 | 10/1985 | Japan ....................................... | 385/14 |
| 2-77031 | 3/1990 | Japan ....................................... | 359/107 |
| 2-220037 | 9/1990 | Japan ....................................... | 385/14 |
| 2302225 | 1/1997 | United Kingdom .............. | G02F 3/00 |

OTHER PUBLICATIONS

M. Schilling, et al., "Wavelength Converter Based on Integrated All–Active Three–Port Mach–Zehnder Interferometer", Electronics Letters, vol. 30, No. 25, pp. 2128–2130, Dec. 1994.

Charles A. Holt, Electronic Circuits Digital and Analog, John Wiley & Sons, New York, Chapter Nine, pp. 251–258, Dec. 1978.

IEEE Photonics Tecnology Letters, vol. 8. No. 9, Sep. 1996 "10 Gb/s Wavelength Conversion with Integrated Multiquantum– Well–Based 3–Port Mach–Zehnder Interferometer"—W. Idler et. al. pp. 1163–1165.

(List continued on next page.)

*Primary Examiner*—Cassandra Spyrou
*Assistant Examiner*—John Juba, Jr.
*Attorney, Agent, or Firm*—Lee, Mann, Smith, McWilliams, Sweeney & Ohlson

[57] ABSTRACT

An optical logic device is provided by an interferometer in which an output optical signal is determined in accordance with an interference condition of the interferometer. The interference condition is reset by an optical setting signal which is counter-propagated through a semi-conductor optical amplifier forming one arm of the interferometer. Latching of the interference condition in the set state is achieved by a feedback signal taken from the output optical signal and combined with the setting signal. Resetting of the interference condition is achieved by nulling the output optical signal by counter-propagating a reset optical signal via second semiconductor optical amplifier constituting the second arm of the interferometer. Alternatively the input optical signal to the interferometer may be interrupted to null the output. A further alternative arrangement utilizes an electrical re-setting signal which actuates an electrical phase shifting device in the second arm of the interferometer. The device has particular application to all optical control of high bit rate communication signals.

17 Claims, 5 Drawing Sheets

OTHER PUBLICATIONS

Electronics Letters, Nov. 11, 1993, vol. 29, No. 23 "Reduction of Harmonic distortion and noise in a semiconductor optical amplifier using bias current feedback"—J.A. Constable et al. pp. 2042–2044.

P. Doussiere, "Recent advances in Conventional and gain–clamped semiconductor optical amplifiers", Topical Meeting on "Optical amplifiers and their applications", Jul. 11–13 1996. Monterey, California, paper SaB1–1 pp. 220–223.

Leos Newsletter Apr. 1997, "Continuous–Wave Operation of a Monolithically Integratable Two–mode Cross–coupled Optical Flip–Flop with Etched Laser Mirrors", Benjamin B. Jian. pp. 6–7.

Electronics Letters Jul. 2, 1992 vol. 28 No. 14 "All–Optical Regenerator based on Nonlinear Fibre Sagnac Inteferometer"—M. Jinno and M. Abe. pp. 1350–1352.

Electronics Letters Jan. 7, 1993 vol. 29 No. 1 "Decision Gate for All–Optical Data Retiming using a Semiconductor Laser Amplifier in a Loop Mirror Configuration"—M. Eiselt et. al. pp. 107–109.

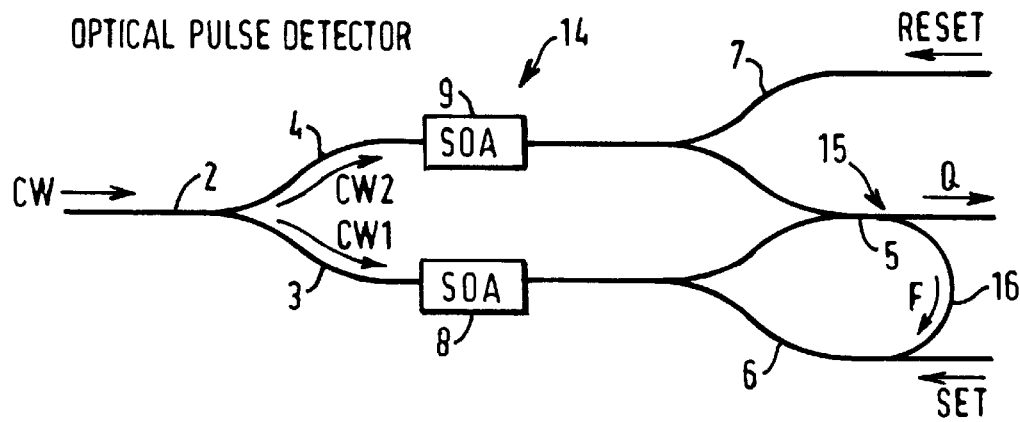
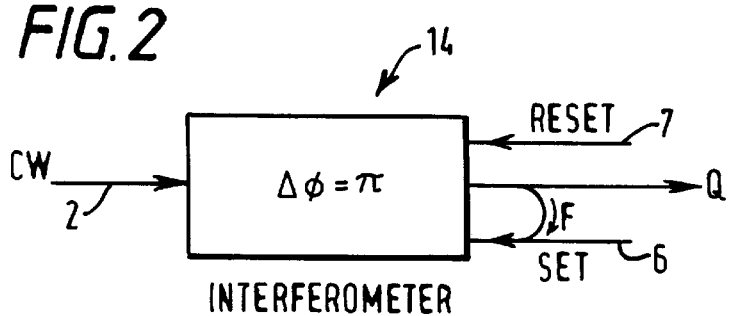
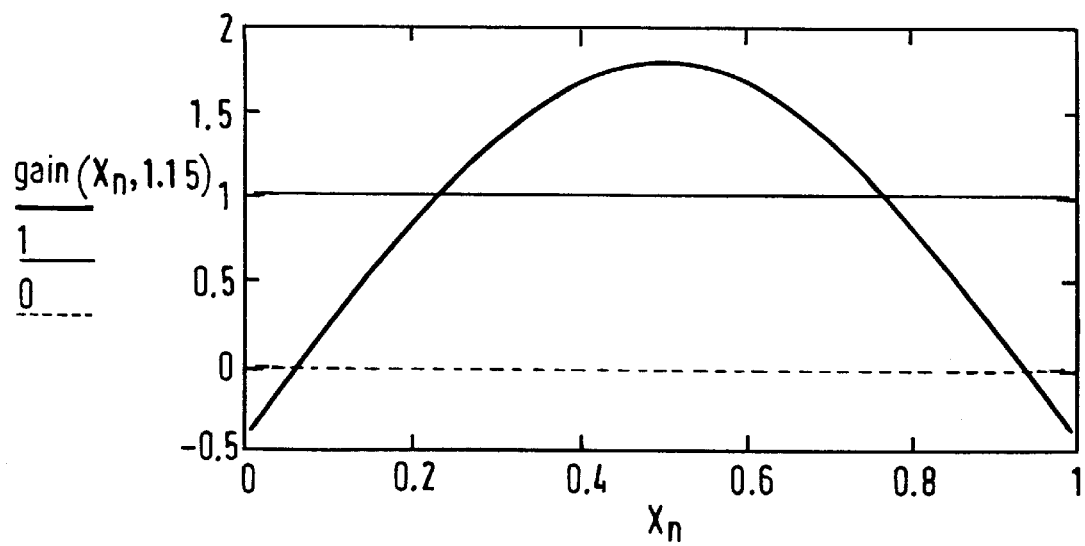

A and not B

| A | B | C |
|---|---|---|
| 0 | 0 | 0 |
| 0 | 1 | 0 |
| 1 | 0 | 1 |
| 1 | 1 | 0 |

A and B

| A | B | C |
|---|---|---|
| 0 | 0 | 0 |
| 0 | 1 | 0 |
| 1 | 0 | 0 |
| 1 | 1 | 1 |

Exclusive NOR

| A | B | C |
|---|---|---|
| 0 | 0 | 1 |
| 0 | 1 | 0 |
| 1 | 0 | 0 |
| 1 | 1 | 1 |

Exclusive OR

| A | B | C |
|---|---|---|
| 0 | 0 | 0 |
| 0 | 1 | 1 |
| 1 | 0 | 1 |
| 1 | 1 | 0 |

OPTICAL DETECTION AND LOGIC DEVICES WITH LATCHING FUNCTION

FIELD OF THE INVENTION

This invention relates to optical detection and logic devices with latching function for use in digital optical communication systems.

BACKGROUND TO THE INVENTION

Optical communication systems typically handle optical pulses with frequencies in the range 2 to 10 GHz with the next generation of systems being expected to handle signals with frequencies up to 40 GHz. In existing systems, logic functions are performed on the pulsed signals as part of regeneration, error detection and clock recovery processes for example, it being typically necessary to convert the optical signals to electrical signals and to reconvert electrical signals to optical signals after performing logical operations and other processing.

The tendency for higher frequency signals means that it is increasingly desirable to avoid such conversion to electronic signals because of the difficulty and expense of high frequency electronic processing.

A number of optical logic devices and methods exist for performing logical operations without conversion to electrical signals but hitherto have proved unsatisfactory in the context of the above communication systems.

It is known from U.S. Pat. No. 4,764,889 (Hinton et al) to provide optical logic arrangements with self electro-optic effect devices for use in an optical digital processor. Control light beams are directed onto electro-optic devices in two dimensional arrays such that elements of the arrays have either transmission or reflection characteristics which are optically controlled. Such arrangements are however suited to relatively low frequency parallel processing rather than logical functions between signals confined within waveguides.

Berthold discloses in U.S. Pat. No. 4,262,992 optical logic elements which operate on the principle of constructive and destructive interference between light beams, the refractive index of certain waveguides being controlled by applied voltages to produce relative phase differences in the propagated signals. A necessary condition for operation however is that optical signals are carried by input lights beams which are coherent, in phase and of equal amplitude which will seldom be the case in a practical communication system.

It is known from U.S. Pat. No. 4,932,739 (Islam) to provide logic functions which utilise soliton trapping between two optical signals propagated in a birefringent fibre. The technique however relies upon the use of frequency filters and polarisers. A further disadvantage is that, where a logic function is to be performed between two optical signals, both optical signals must be in the form of pulses having similar characteristics. Since the soliton trapping effect is associated with very long fibre lengths, it is anticipated that the lengths of fibre required would make use of such techniques impracticable.

It is known from Idler et al (IEEE Photonics Technology Letters, Vol. 8, No. 9, Sep. 1996—"10 Gb/s Wavelength Conversion with Integrated Multiquantum-Well-Based 3-Port Mach-Zehnder Interferometer") to provide inversion of a single optical signal in addition to wavelength conversion by means of a Mach-Zehnder interferometer in which semiconductor optical amplifiers are utilised to set an interference condition between optical components of an input signal transmitted through first and second arms of the interferometer. A continuous wave optical signal propagated equally through the first and second arms is recombined to form an output signal which is modulated according to the interference condition and a pulsed optical signal is counter-propagated through only one of the arms so as to modulate the phase of one of the component signals by cross-phase modulation due to the non-linear characteristics of the semiconductor optical amplifier in that arm.

It is known from LEOS Newsletter, April 1997, "Continuous-Wave Operation of a Monolithically Integratable Two-Mode Cross-Coupled Optical Flip-Flop with Etched Laser Mirrors", Benjamin B. Jian, to provide an optical flip-flop device in the form of a laser which can operate bistably, switching between states when triggered by an optical pulse. The device relies upon accurate microfabrication of an active element having a relative large surface area to provide a corner reflector laser mirror configuration. The output also fails to provide a few intensity state whereas optical logic systems generally employ bilevel states in which binary "0" is represented by zero intensity state.

There remains a need for a practical technique for performing optical detection and for providing logic devices with latching function in an optical communication system.

SUMMARY OF THE INVENTION

It is object of the invention to provide improved apparatus and methods of optical detection and logic devices with latching functions optical logic devices and methods.

According to the present invention there is disclosed an optical logic device having a latching function, the device comprising:

an interferometer having an input waveguide for the input of an input optical signal and an output waveguide operable to output an output optical signal having a signal state representative of a logic state determined in accordance with an interference condition of the interferometer;

setting means operable to set the interference condition wherein the setting means is responsive to a further optical signal to change the interference condition to thereby change from one state to another the logic state represented by the output optical signal; and latching means operable to maintain the interference condition set by the setting means.

The interference conditions can conveniently be set by means of a phase modulating means such as a semiconductor optical amplifier comprising one of the arms of the interferometer. The further optical signal may conveniently be counter-propagated through the semi-conductor optical amplifier relative to the direction of propagation of a component of the input signal. The non-linear effect of cross-modulation appearing in the semi-conductor optical amplifier then provides phase modulation of the component input optical signal which, under appropriate bias conditions of the semi-conductor optical amplifier, provides the required change of interference condition.

The latching means may be provided by dividing a feedback optical signal from the output signal and inputting the feedback optical signal to the interferometer so as propagate through the phase modulating means. A latching function is thereby provided by maintaining the changed phase relationship after removal of the further optical signal.

The optical logic device may be reset by changing the interference condition to a state in which the output optical signal is nulled. This may be accomplished by propagating a re-setting optical signal through a second phase modulating means constituting the other of the arms of the interferometer so as to change the phase relationship such that the output optical signal is nulled. Alternatively, the input optical signal may be interrupted to thereby null the output signal.

An optical pulse detector is provided in accordance with the present invention by the above disclosed optical logic device wherein the further optical signal comprises an optical pulse to be detected and wherein the setting means is responsive to the optical pulse to change the interference condition, thereby changing the logic state represented by the output optical signal to indicate detection of the optical pulse.

The method and apparatus of the present invention may be used to provide optical pulse detection and logic devices such as flip-flops as described in the following examples.

BRIEF DESCRIPTION OF THE DRAWINGS

For a better understanding of the invention and how the same may be carried into effect, preferred embodiments will now be described by way of example only and with reference to the accompanying drawings, of which:

FIG. 1 is a schematic diagram of an optical pulse detector in accordance with the present invention;

FIG. 2 is a block diagram representing the detector of FIG. 1;

FIG. 3 is a graphical representation of the gain characteristic of the interferometer of FIGS. 1 and 2;

Logic devices in accordance with the present invention make use of interformeters which output an output signal having a signal state representative of a logic state determined in accordance with an interference condition of the interforometer. Before describing an optical logic device having a latching function, interformeters which do not have a latching function but which nevertheless are useful in conjunction with devices in accordance with the present invention will now be described with reference to FIGS. 5, 6 and 7. A description of devices with a latching function will then be developed in the subsequent description.

Figure 5:
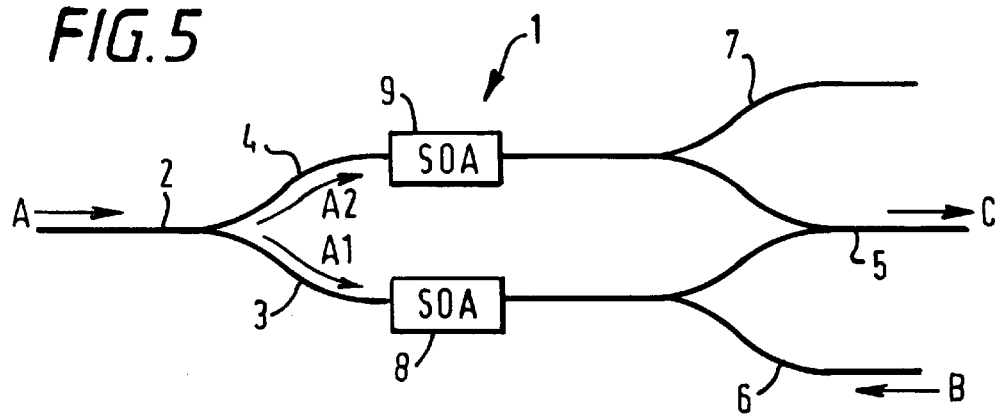
FIG. 5 is a schematic diagram of an interferometer acting as an optical logic device.

In FIG. 5, an interferometer 1 of a first type comprises a Mach-Zehnder interferometer of the non-loop configuration in which a first input waveguide 2 is divided into first and second arms 3 and 4 which are subsequently recombined to form an output waveguide 5. A second input waveguide 6 is coupled to the first arm adjacent to the output waveguide 5 so as to allow injection of optical signals to the first arm 3 in a counter-direction relative to propagation from the first input waveguide 2 to the output waveguide 5. A third input waveguide 7 is similarly coupled to the second arm 4 such that the first and second arms 3 and 4 are coupled to the second and third input waveguides in a symmetrical manner.

Figure 6:
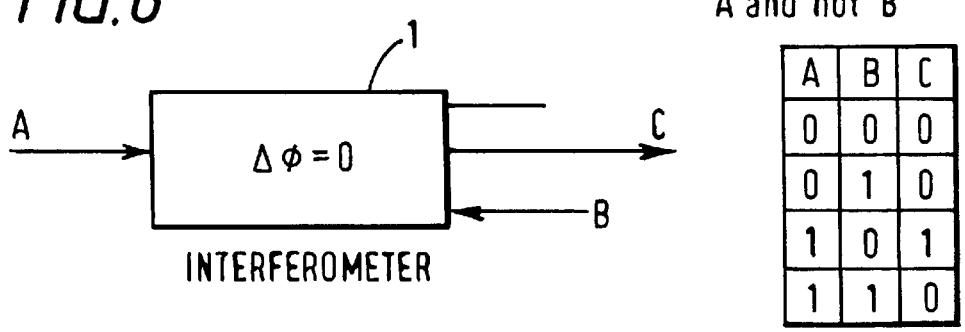
FIG. 6 is a schematic representation of the interferometer of FIG. 5 and a truth table representative of its logic function.

The first arm 3 includes a first semiconductor optical amplifier 8 and the second arm 4 is similarly provided with a second semiconductor optical amplifier 9. Each of the semiconductor optical amplifiers 8 and 9 is configured to operate as a travelling wave amplifier with internal reflections being suppressed in known manner. The semiconductor optical amplifiers 8 and 9 are each supplied with bias currents which are maintained at controlled levels determined according to a required phase relationship between the optical signals transmitted to the output waveguide 5. In the absence of counter-propagating optical signals injected via the second and third input waveguides 6 and 7, there are two possible biasing conditions which are useful in the context of the devices of the present invention. In the first case, an input signal A injected into the first input waveguide 2 is divided into first and second components A1 and A2 which experience equal phase delays when being transmitted through the first and second arms 3 and 4 including the semiconductor optical amplifiers 8 and 9 such that they recombine with constructive interference at the output waveguide 5. This bias condition is represented in FIG. 6 and in subsequently described Figures where this bias condition applies by a phase difference $\Delta\phi=0$. An output optical signal C would then replicate the input optical signal A.

The bias condition is however set up such that when a second optical signal B is injected for counter-propagation via the second input waveguide 6, the first component A1 experiences a phase shift of $\pi$ when propagated through the first semiconductor optical amplifier 8 due to the non-linear properties of the amplifier material resulting in cross-phase modulation. The resulting output signal C would then be modulated to a zero state by destructive interference between the out of phase first and second components A1 and A2.

The interferometer 1 in this configuration as shown schematically in FIG. 6 provides the logic function of "A and not B" as illustrated in the truth table of FIG. 6 in which "0" represents a logic state of optical signals A, B and C of zero intensity and "1" represents a binary-one logic state in which the intensity of the signals A, B and C corresponds to a predetermined level.

Figure 7:
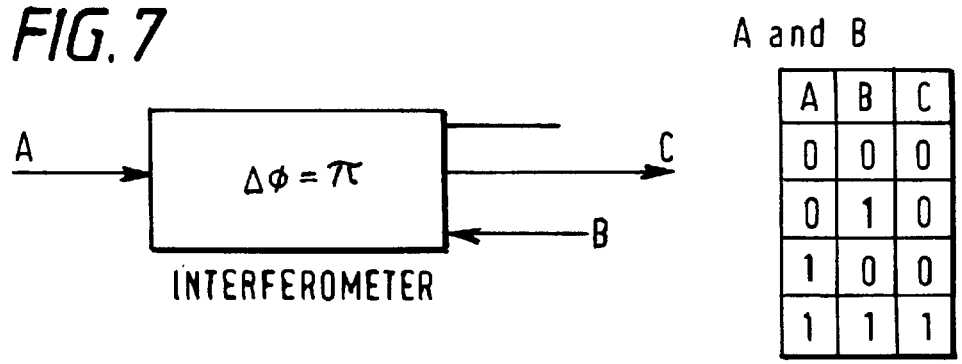
FIG. 7 is a schematic representation of the interferometer of FIG. 5 having an alternative phase relationship and including a truth table representative of its logic function.

The semiconductor optical amplifiers 8 and 9 may alternatively be biased such that, in the absence of counter-propagating signal B, a phase difference of $\pi$ exists in the recombined components at the output waveguide 5, thereby providing a zero state for output signal C, this bias condition being represented by $\Delta\phi=\pi$ as illustrated in FIG. 7 and in subsequently described Figures where this bias condition applies. In the presence of the counter-propagating second optical signal B, the phase of the first component A1 is modulated by a phase increment of $\pi$ such that the first and second components A1 and A2 combine with constructed interference in the output waveguide 5, thereby providing logic state "1" as the output signal C. As shown in the truth table of FIG. 7, the bias condition corresponding to $\Delta\phi=\pi$ gives a logic device performing the function "A AND B".

In the above described interferometer, the third input waveguide 7 is not utilised and may therefore be omitted. It is however conveniently retained to preserve symmetry in the structure of the first and second arms 3 and 4 and would allow a device of the same physical structure to be utilised in the following alternative configuration described for example with reference to FIG. 8.

Figure 8:
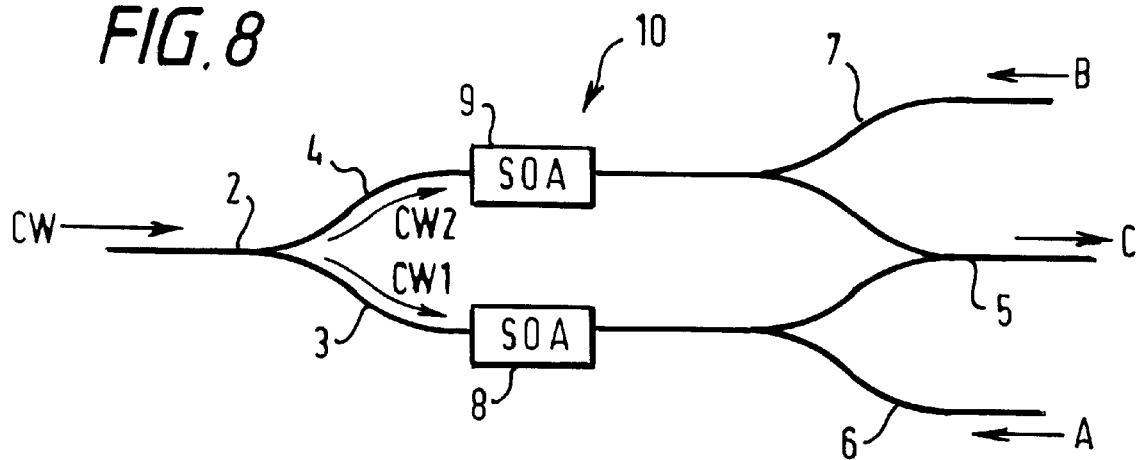
FIG. 8 is a schematic diagram of a further interferometer acting as a logic device.

FIG. 8 illustrates a further logic device 10 corresponding to the interferometer 1 of FIG. 5 but additionally coupled to receive a counter-propagating signal via the third input waveguide 7. In the device 10 of FIG. 8, a continuous wave optical signal CW is input to the first input waveguide 2 and divided into first and second components CW1 and CW2 propagated through the first and second arms 3 and 4. The components CW1 and CW2 are recombined to form output signal C to provide logic state "1" or "0" depending upon an interference condition existing in the interferometer, as defined by the manner in which the semiconductor optical amplifiers 8 and 9 are biased. Taking as a first example the case where the relative phase difference introduced by the semiconductor optical amplifiers in the absence of counter-propagating input signals is zero, i.e. the $\Delta\phi=0$ condition illustrated schematically in FIG. 9, in the absence of input signals A and B the output signal C assumes a continuous wave signal, corresponding to logic state 1. A first optical signal A injected via the second input waveguide 6 for counter-propagation through the first semiconductor optical amplifier 8 results in a phase change of $\pi$ in the propagation of the first component CW1 via the first arm 3 such that the interference condition is altered to provide logic state "0" at the output signal C. If A has a "0" state, injection of a second optical signal B via the third input waveguide 7 causes a phase change of $\pi$ in the second semiconductor optical amplifier 9 so that similarly the logic state "0" is assumed by the output signal C. If however both A and B have logic state "1", thereby resulting in the phase difference $\pi$ being introduced into both first and second arms 3 and 4, constructive interference occurs at the output signal C which assumes logic state "1".

Figure 9:
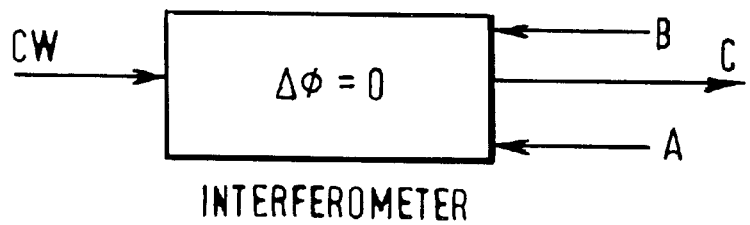
FIG. 9 is a block diagram of the interferometer of FIG. 8 and a truth table representing its logic function.

As illustrated in the truth table of FIG. 9, this $\Delta\pi=0$ bias condition results in the logic function of "exclusive NOR".

Figure 10:
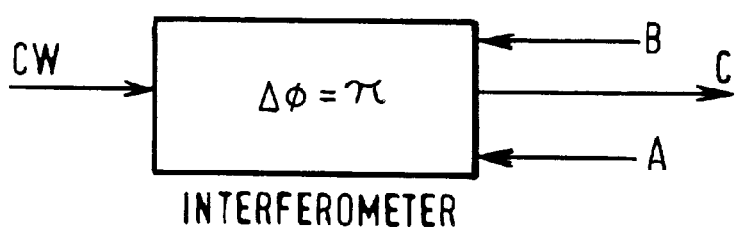
FIG. 10 is a block diagram of the interferometer of FIG. 8 with an alternative phase relationship and a truth table representative of its logic function.

Alternatively, the semiconductor optical amplifiers 8 and 9 of FIG. 8 may be biased such that, in the absence of counter-propagating input signals A and B, a phase differential $\pi$ is introduced between the first and second arms 3 and 4 so that a continuous wave input results in a zero state output signal C. Constructive interference can be restored by injecting either one of counter-propagating optical signals A and B. If however both A and B have logic state "1", the phase differential $\pi$ is maintained and output signal C assumes zero state. As illustrated in the truth table of FIG. 10, this bias condition results in the logic function "exclusive OR".

The interferometer of FIG. 8 may be modified to provide an optical pulse detector 14 in accordance with the present invention as shown in FIG. 1 in which a coupler 15 is connected to the output waveguide 5 so as to extract a predetermined proportion of an output optical signal Q obtained by recombining first and second components CW1 and CW2 derived from a continuous wave input signal CW. A feedback waveguide 16 is coupled into the second input waveguide 6 so as to direct a feedback signal F (i.e. the proportion of Q) into the second input waveguide 6 to be countered-propagated through the first arm 3.

As indicated schematically in FIG. 2, the semiconductor optical amplifiers 8 and 9 in the first and second arms 3 and 4 of the interferometer forming the optical pulse detector 14 are biased such that the phase differential $\Delta\phi=\pi$ exists in the absence of counter-propagating signals in the first and second arms. In this condition, the output Q is "0". If a "SET" pulse is input to the second input waveguide 6, a phase differential created in semiconductor optical amplifier 8 changes the interference condition such that constructive interference occurs in the output waveguide 5, changing the output Q to logic state "1". Feedback signal F conducted through the feedback waveguide 16 reinforces the SET signal and is determined by the coupler 15 to have sufficient magnitude to maintain the phase differential for constructive interference after the SET pulse is removed. The optical pulse detector 14 thereby operates as a flip-flop to detect a SET pulse input by indicating an appropriate output signal Q.

The flip-flop is reset by inputting a RESET signal to the third input waveguide 7 to create a phase differential of $\pi$ in the second semiconductor optical amplifier 9, thereby changing the interference condition of the interferometer to reset Q to "0". Since the feedback signal F also returns to "0", Q remains at logic state "0" after removal of the RESET pulse.

To achieve satisfactory latching, the optical coupling around the feedback loop provided by waveguide 16 should be set to be such that the full output swing creates between $1.0\,\pi$ and $1.1\,\pi$ phase change. FIG. 3 illustrates the dynamic open loop gain of the system for the case where the phase change is $1.1\,\pi$, the gain being graphically represented as a function of X where X is the proportion of full output swing. The loop is unstable in the region corresponding to values of X where the gain is greater than unity, thereby ensuring that the effect of positive feedback latches the output to the "0" or "1" state. A slight negative gain is provided near to the "0" and "1" states to help ensure stability in those states. Larger amounts of negative gain should however be avoided since the combined phase shift of the semiconductor optical amplifier response and the loop delay would then create ringing or oscillation.

Figure 4:
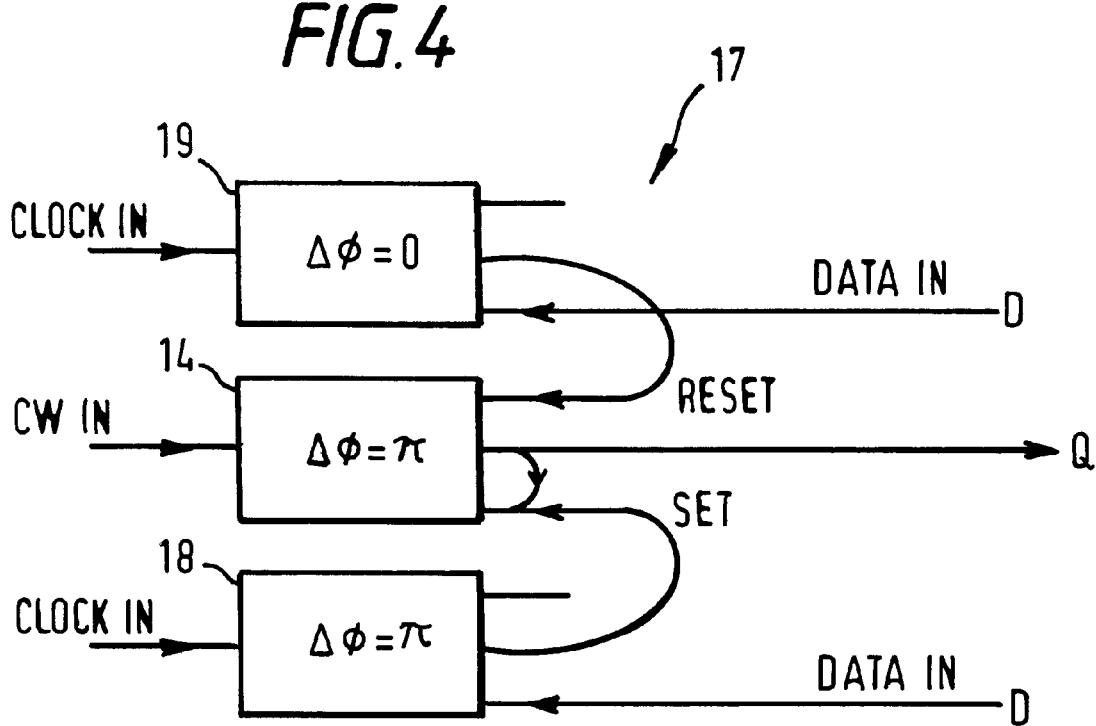
FIG. 4 is a block diagram of a flip-flop device in accordance with the present invention.

The optical pulse detector 14 of FIG. 1 may be combined with logic devices of previously described FIGS. 5 to 10 provide other forms of flip-flop devices and detectors as shown for example in FIG. 4. In FIG. 4 a latching flip-flop 17 is formed by the combination of an optical pulse detector 14 receiving a set input from a logic device 18 providing logic function "A AND B", a reset pulse being provided by the output of a logic device 19 providing the logic function "A and not B". Each of the logic devices 18 and 19 receives a clock pulse input at the first input waveguide 2 and a data input D at respective second input waveguides 6.

Figure 11:
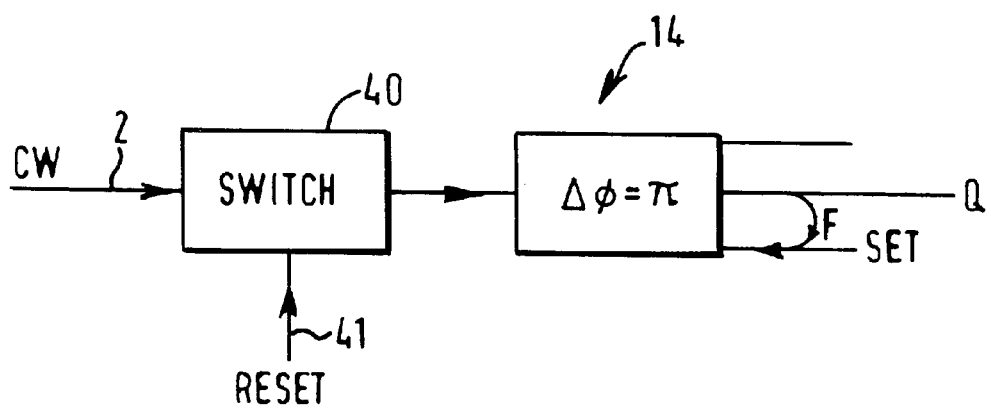
FIG. 11 is a block diagram illustrating a further optical logic device having a latching function in accordance with the present invention.

The optical pulse detector 14 of FIG. 1 is an example of an optical logic device in accordance with the present invention having a latching function, the device having an output logic state determined in accordance with an interference condition of the interferometer 14 and the device having means for setting the interference condition to thereby change from one state to another. Alternative embodiments of such devices are envisaged in which for example the device is re-set by interrupting the continuous wave input to the first waveguide 2 as shown in FIG. 11, thereby changing the output signal Q to a null value and interrupting the latching function of the feedback signal F. In this embodiment, the Reset signal 41 is input to an optical switching device 40 arranged such that the continuous wave input is interrupted in the presence of the Reset signal. The switching device 40 may for example be an interforometer of the type described above with reference to FIG. 6.

Figure 12:
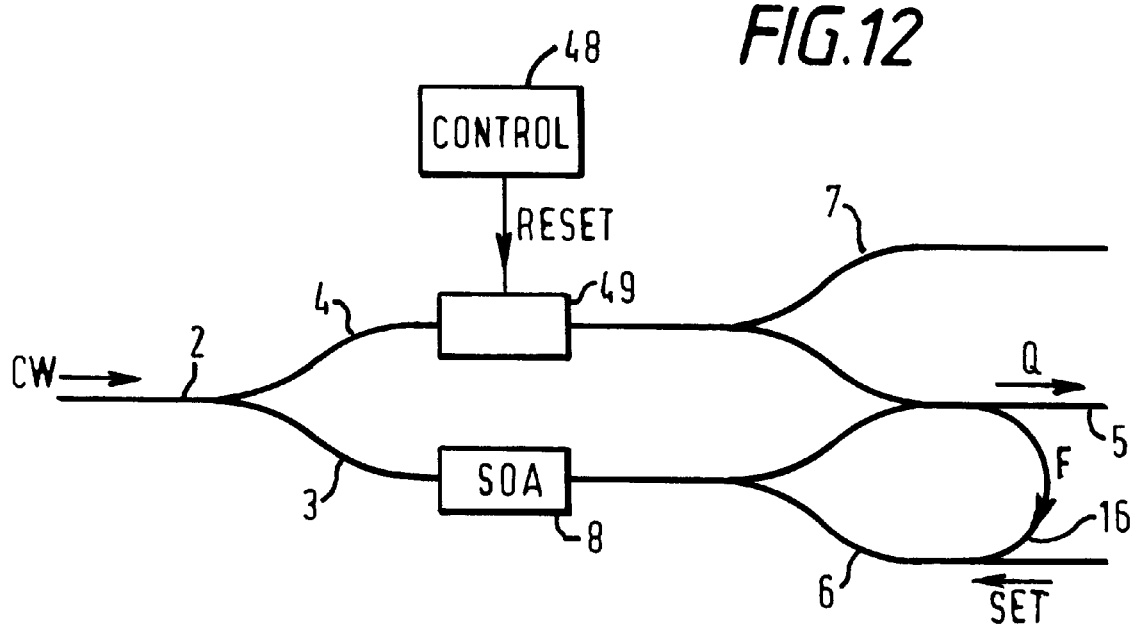
FIG. 12 is a further alternative optical logic device having a Latching function and an electronically controlled re-setting means.

A further alternative embodiment is shown in FIG. 12 and will be described using corresponding references to those of FIG. 1 for corresponding elements. The device of FIG. 12 has an interferometer in which the first arm 3 includes a first semiconductor optical amplifier 8. The second arm 4 however includes an electrically controlled phase shifting device 49 which is controlled by operation of a control circuit 48. The interferometer of FIG. 12 is configured such that, in the absence of a setting optical signal via second input waveguide 6, the semiconductor optical amplifier 8 and the phase shifting device 49 co-operate to provide an interference condition in which the output Q has a zero state. In response to the input of a setting signal via the second input waveguide 6, phase modulation in the semiconductor optical amplifier 8 results in the interference condition changing such that the output signal is representative of Q=1.

Feedback provided by feedback signal F serves to maintain this interference condition after the setting optical signal is removed, the feedback optical signal F being counter-propagated through the semiconductor optical amplifier 8 and providing cross phase modulation.

In order to reset the logic device, the control circuit 48 inputs an electrical reset signal to the phase shifting device 49 for a sufficient period to null the output optical signal by restoring the interference condition to provide destructive interference at the output. After removal of the reset signal, the output optical signal remains nulled since the feedback optical signal F is similarly reduced to zero.

Figure 13:
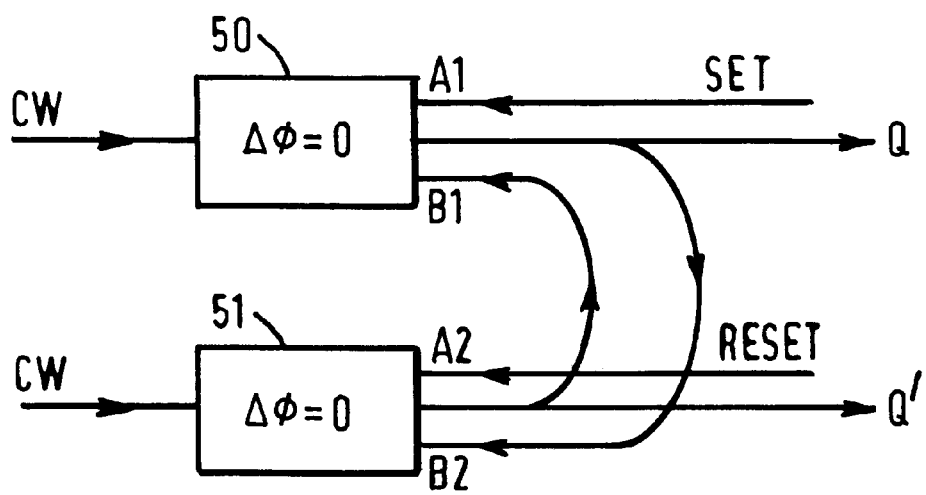
FIG. 13 is a further alternative flip flop device in accordance with the present invention.

A further alternative arrangement in accordance with the present invention is illustrated in FIG. 13. A flip flop optical circuit is formed by first and second interferometers 50 and 51, each of which corresponds to the interferometer arrangement shown in FIG. 9. The first interferometer 50 receives an input continuous wave signal and outputs an output signal representing logic state Q which depends upon an interference condition in the interferometer. Part of output signal Q is fed back into the second interferometer 52 at input B2 to be counterpropagated in one arm of the second interferometer. The second interferometer 52 has a second input A2 for receiving a Reset signal to be counterpropagated in the other arm of the second interferometer. The second interferometer 51 similarly receives a continuous wave signal input and outputs an output signal representing logic state Q' which is the inverse of Q. Part of output signal Q' is fed back into input B1 of the first interferometer 50 to be counterpropagated in one arm of the first interferometer. The first interferometer has a second input A1 for receiving a Set signal to be counterpropagated in the other arm of the first interferometer.

The first interferometer 50 is biased such that the interference condition in the first interferometer creates constructive interference (Q=1) when inputs A1 and B1 receive signals representing the same value (0,0 or 1,1). The second interferometer 51 is similarly biased.

The above described feedback arrangement provides that the possible states of Q, Q' are 1,0 or 0,1. Taking for example the case where Q=0, the feedback signal at input B2 is 0 so that, in the absence of the Reset signal, constructive interference occurs in the second interferometer 51 and Q'=1. A corresponding signal at B1 therefore provides an input to the first interferometer 50 which sets the interference conditions to provide destructive interference, maintaining Q=0. The input of a transient signal to the Set input A1 of the first interferometer 50 changes the interference condition in the first interferometer 50 to constructive interference, setting Q=1 and inputting a feedback signal at input B2 into the second interferometer 51. The interference condition of the second interferometmer 51 is thereby changed to destructive interference and Q' is set to 0. By a similar mechanism, the states Q, Q' can be reversed by the input of a transient Reset signal to the input A2 of the second interferometer.

The logic operations described above with reference to FIGS. 1 to 11 and FIG. 13 may be described as "all-optical logic functions" in that logic functions between optical signals are performed without conversion to the electrical domain. Such all-optical logic functions are particularly useful in applications where logic functions are to be performed at an inaccessible location such that it is desirable to locate electronic equipment at an accessible base station. All-optical logic functions may thereby be performed at the inaccessible location by transmitting control optical signals from the base station.

In each of the above described embodiments, semiconductor optical amplifiers are set at controlled bias conditions to achieve a desired phase condition and a desired phase differential in response to signal propagation. In order to determine the bias conditions for the semiconductor optical amplifiers in terms of the supply voltage required for operation, it is necessary to determine the levels of optical signals corresponding to logic states "1" and "0" and for those levels to respectively remain constant. Optical signal levels may be regulated using automatic control of signal levels using an optical amplifier controlled by a feedback circuit, an attenuator controlled by a feedback circuit, or by using a saturation effect in either an amplifier or an absorber. An example of how the operation of a semiconductor optical amplifier can be controlled using bias current feedback is described by J A Constable et al in "Reduction Of Harmonic Distortion And Noise In A Semiconductor Optical Amplifier Using Bias Current Feedback"; Electronics Letters, Nov. 11, 1993, Vol. 29, No. 23. Other forms of variable gain devices may be used as a control element to achieve automatic level control such as rare earth, Raman and parametric amplifiers.

An example of a variable absorption device would be an electro-absorption modulator having an absorption which varies with reverse bias. A Mach-Zehnder interferometer may alternatively be used as a variable attenuator, one arm of the interferometer being provided with a phase shift modulator such as an integrated heating element operable in response to a feedback signal to regulate the temperature of a waveguide forming the interferometer arm.

Devices described above in accordance with the present invention may comprise semiconductor optical amplifiers and waveguides formed integrally in a single semiconductor device.

It is envisaged that a plurality of devices described above in accordance with the present invention will be interconnected such that, for example, one logic device 14 will provide a means of detecting an optical signal to provide an optical signal Q to be input to a subsequent logic device, as described above, for example, with reference to FIGS. 5 to 10.

Other variations will be apparent to a person skilled in the art, falling within the scope of the appended claims.

I claim:

1. An optical logic device having a latching function, the device comprising:

an interferometer having an input waveguide for the input of an input optical signal and an output waveguide operable to output an output optical signal having a signal state representative of a logic state determined in accordance with an interference condition of the interferometer, wherein the interferometer comprises first and second arms connected between the input and output waveguides operable to determine a phase relationship between respective components of the input optical signal propagated through the first and second arms, wherein one of the arms comprises a phase modulating means, the phase modulating means being operable to change the phase relationship in response to propagation of a further optical signal through the phase modulating means to thereby change the interference condition;

setting means operable to set the interference condition wherein the setting means is responsive to the further optical signal to change the interference condition to thereby change from one state to another the logic state represented by the output optical signal; and latching means operable to maintain the interference condition set by the setting means, the latching means comprising feedback means operable to divide a feedback optical signal from the output signal and to input the feedback optical signal to the interferometer so as to propagate through the phase modulating means to thereby provide a latching function by maintaining the changed phase relationship after removal of the further optical signal;

resetting means operable to change the interference condition to a state in which the output optical signal is nulled.

2. An optical logic device as claimed in claim 1 wherein the input optical signal comprises a continuous wave signal and wherein the re-setting means comprises means for propagating a re-setting optical signal through a second phase modulating means constituting the other of the arms of the interferometer so as to change the phase relationship such that the output optical signal is nulled.

3. An optical logic device as claimed in claim 2 wherein the second phase modulating means comprises a semiconductor optical amplifier.

4. An optical logic device as claimed in claim 2 wherein the re-setting optical signal is counter-propagated in said other arm of the interferometer relative to the direction of propagation of the respective component of the input optical signal and wherein the second phase modulation means is operable to provide phase modulation by cross-modulation between the re-setting optical signal and said component.

5. An optical logic device as claimed in claim 2 wherein the input optical signal comprises a continuous wave signal and wherein the re-setting means comprises means for interrupting the input optical signal thereby nulling the output optical signal.

6. An optical logic device as claimed in claimed 1 wherein the other arm of the interferometer comprises an electrically actuated phase shifting device constituting the re-setting means and operable to change the phase relationship such that the output optical signal is nulled.

7. An optical logic device as claimed in claimed 1 wherein the interferometer comprises a Mach-Zehnder interferometer.

8. An optical logic device as claimed in claim 1 wherein the phase modulating means comprises a semiconductor optical amplifier.

9. An optical logic device as claimed in claim 1 wherein the further optical signal is counterpropagated in said one of the arms relative to the direction of propagation of the respective component of the input optical signal and wherein the phase modulation means is operable to provide phase modulation by cross modulation between the further optical signal and said component.

10. A method of operating an optical logic device comprising the steps of:

inputting an input optical signal to an input waveguide of an interferometer comprising first and second arms connected between the input and output waveguides;

outputting an output optical signal via an output waveguide of the interferometer such that the output signal has a signal state representative of a logic state determined in accordance with an interference condition of the interferometer;

determining a phase relationship between respective components of the input optical signal propagated through the first and second arms by operation of a phase modulating means constituting one of the arms;

setting the interference condition of the interferometer in response to a further optical signal to change the interference condition and thereby change from one state to another the logic state represented by the output optical signal by changing the phase relationship by operation of the phase modulating means in response to propagation of the further optical signal through the phase modulating means to thereby change the interference condition to represent a changed logic state;

and thereafter maintaining the interference condition set in the setting step by dividing a feedback optical signal from the output signal and inputting the feedback optical signal to the interferometer so as to propagate through the phase modulating means, thereby latching the output signal by maintaining the changed phase relationship after removal of the further optical signal.

11. A method as claimed in claim 10 wherein said changing the phase relationship step is effected by operation of a semi-conductor optical amplifier constituting the phase modulating means.

12. A method as claimed in claim 10 including the step of counter-propagating the further optical signal in said one of the arms relative to the direction of propagation of the respective component of the input optical signal; and providing phase modulation by cross modulation between the further optical signal and said component.

13. A method as claimed in claim 10 including the step of re-setting the interference condition to a state in which the output optical signal is nulled comprising propagating a re-setting optical signal through a second phase modulating means constituting the other of the arms of the interferometer so as to change the phase relationship such that the output optical signal is nulled.

14. A method as claimed in claimed 13 wherein the second phase modulating means comprises a semi-conductor optical amplifier.

15. A method as claimed in claim 13 wherein the re-setting step comprises counter-propagating the re-setting optical signal in said other arm of the interferometer relative to the direction of propagation of the respective component of the input optical signal and wherein the second phase modulation means provides phase modulation by cross modulation between the re-setting optical signal and said component.

16. A method as claimed in claim 13 wherein said re-setting step comprises interrupting the input optical signal to thereby null the output optical signal.

17. A method as claimed in claimed 13 wherein the re-setting step comprises electrically actuating a phase shifting device in the other arm of the interferometer so as to change the phase relationship such that the output optical signal is nulled.

* * * * *